(No Model.)
W. J. TEMPLE.
SHAFT COUPLING.
No. 562,206. Patented June 16, 1896.
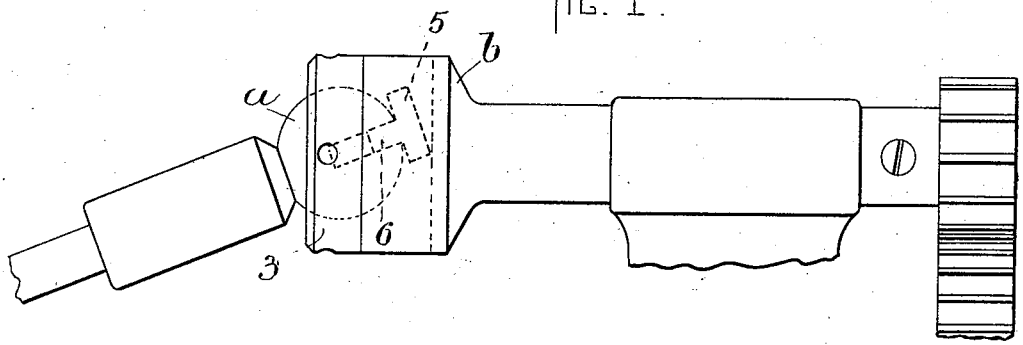
Fig. 1.
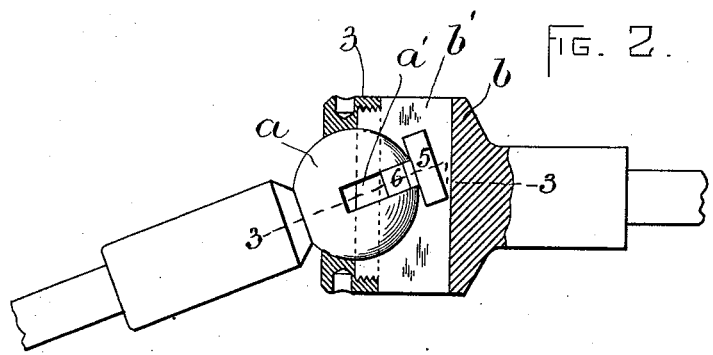
Fig. 2.
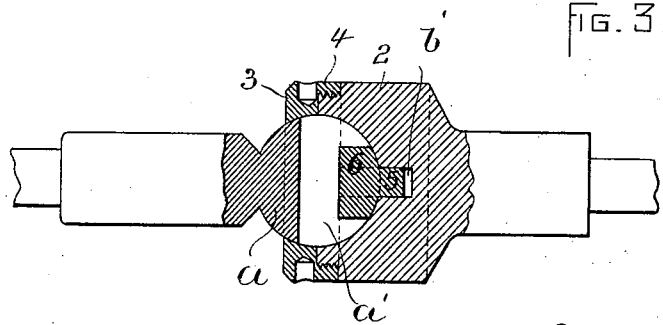
Fig. 3.
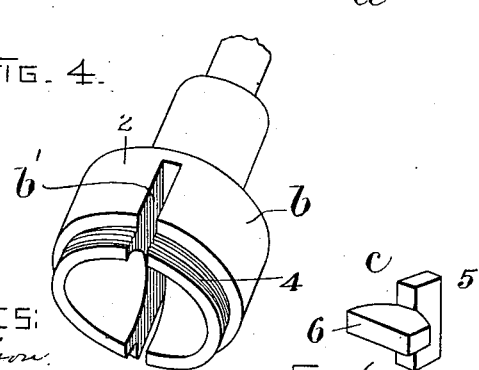
Fig. 4.
Fig. 5.
Fig. 6.
WITNESSES:
A. D. Harrison
A. D. Adams
INVENTOR:
W. J. Temple
by Knight Brown Quimby
Attys.
ANDREW B.GRAHAM, PHOTO-LITHO. WASHINGTON, D.C.

UNITED STATES PATENT OFFICE.

WILLIAM J. TEMPLE, OF HAMPDEN, MAINE, ASSIGNOR OF TWO-THIRDS TO HORACE PICKARD AND GEORGE SWEETSER, OF SAME PLACE.

SHAFT-COUPLING.

SPECIFICATION forming part of Letters Patent No. 562,206, dated June 16, 1896.

Application filed April 11, 1896. Serial No. 587,120. (No model.)

*To all whom it may concern:*

Be it known that I, WILLIAM J. TEMPLE, of Hampden, in the county of Penobscot and State of Maine, have invented certain new and useful Improvements in Shaft-Couplings, of which the following is a specification.

This invention relates to universal-joint shaft-couplings whereby one section of a shaft is enabled to impart rotary motion to another standing at an angle to it, the angle being variable, so that while one section of the shaft may be in fixed bearings, the other may be capable of swinging in any desired direction to vary the position of an operating-tool carried by the movable or swinging section.

The invention is intended particularly for use in connection with the horseshoe-calk-sharpening machine set forth in Letters Patent of the United States No. 548,896, dated October 29, 1895, although it may be applied to any other use to which it is applicable.

The invention consists in the improved construction which I will now proceed to describe and claim.

Of the accompanying drawings, forming a part of this specification, Figure 1 represents a side elevation showing two sections of shafting connected by my improved coupling. Fig. 2 represents a view similar to Fig. 1, showing one member of the coupling in section. Fig. 3 represents a section on line 3 3 of Fig. 2. Fig. 4 represents a perspective view of one of the sections of the socket member of the coupling. Fig. 5 represents a partial side view and a partial section of the other section of the socket member. Fig. 6 represents a perspective view of the coupling-link that connects the two members.

The same letters and numerals of reference indicate the same parts in all the figures.

My improvement relates to shaft-couplings of the ball-and-socket type, the coupling comprising a substantially spherical member $a$, which I will hereinafter term the "ball," and a member $b$, having a socket formed to inclose the greater portion of the ball, the ball being free to oscillate in the socket. The socket is here shown as composed of two sections 2 3, united by a screw-thread connection at 4, the section 3 contracting the socket at the point where the ball projects therefrom, thus preventing the separation of the ball from the socket. In the ball $a$ is formed a slot or guideway $a'$, the sides of which are flat and parallel.

The socket member $b$ is provided with a slot or guideway $b'$, the sides of which are also flat and parallel, the said guideway communicating with the interior of the socket, as shown in Fig. 4.

$c$ represents a link, which is composed of two rigidly-connected ears 5 6, arranged at right angles to each other. The ear 5 is formed to move in the guideway $b'$, while the ear 6 is formed to move in the guideway $a'$, or, in other words, to permit the movement of the sides of the guideway upon it.

It will be seen that rotary motion imparted to the member $b$ will be communicated by the sides of the guideway $b'$ to the ear 5 and from the latter to the ear 6, which in turn, by its bearing on the sides of the guideway $a'$, will impart rotary motion to the ball $a$. The freedom of movement of the ears 5 and 6 on the sides of the respective guideways, enables the section of the shaft to which the ball $a$ is affixed to stand at any desired angle to the section to which the socket $b$ is affixed, this giving the desired flexibility or freedom of movement of one section upon the other.

My improvement gives the movable section of the shaft freedom of movement through a longer arc than is possible by any ball-and-socket shaft-coupling of which I am aware. In other words, the swinging section is enabled to approach a position more nearly at right angles with the other section than heretofore.

I claim—

A shaft-coupling comprising a socketed member having a guideway external to the socket, a ball member fitted in said socket and having a guideway within the ball, and a coupling-link composed of two rigidly-connected ears arranged substantially at right angles with each other and engaged with the guideways of the said members.

In testimony whereof I have signed my name to this specification, in the presence of two subscribing witnesses, this 1st day of April, A. D. 1896.

WILLIAM J. TEMPLE.

Witnesses:
 CHAS. HAMLIN,
 ALICE MCHUGH.